United States Patent
Li

(10) Patent No.: US 9,671,808 B2
(45) Date of Patent: Jun. 6, 2017

(54) CIRCUIT AND METHOD FOR CONTROLLING STANDYBY POWER CONSUMPTION

(71) Applicant: Shenzhen China Star Optoelectronics Technology Co., Ltd., Shenzhen, Guangdong (CN)

(72) Inventor: Fei Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 441 days.

(21) Appl. No.: 14/373,345

(22) PCT Filed: Apr. 1, 2014

(86) PCT No.: PCT/CN2014/074511
§ 371 (c)(1),
(2) Date: Jul. 18, 2014

(87) PCT Pub. No.: WO2015/139337
PCT Pub. Date: Sep. 24, 2015

(65) Prior Publication Data
US 2015/0301545 A1 Oct. 22, 2015

(30) Foreign Application Priority Data
Mar. 18, 2014 (CN) .......................... 2014 1 0099625

(51) Int. Cl.
G05B 11/01 (2006.01)
G05D 3/12 (2006.01)
G05F 1/66 (2006.01)
G05B 15/02 (2006.01)

(52) U.S. Cl.
CPC ............... *G05F 1/66* (2013.01); *G05B 15/02* (2013.01)

(58) Field of Classification Search
None
See application file for complete search history.

(56) References Cited

U.S. PATENT DOCUMENTS 5,910,887 A * 6/1999 Kim ...................... H04N 3/185
315/411
5,916,313 A * 6/1999 Brown .................. H02M 3/156
713/300

(Continued)

*Primary Examiner* — Adam Lee
(74) *Attorney, Agent, or Firm* — Andrew C. Cheng

(57) ABSTRACT

A circuit for controlling standby power consumption is disclosed. The circuit includes a main power supply, a transformer, a first switch transistor, a load, a low frequency divider circuit, and a signal generation unit. The transformer connects to one end of the signal generation unit and an input end of the low frequency divider circuit. The signal generation unit transmits the level signals to the low frequency divider circuit according to the operating mode and obtains the power supply voltage of the transformer. The second frequency of the low level signals is greater than the first frequency of the high level signals. The source of the first switch transistor connects to a load to obtain the frequency of the output signals to be operating frequency so as to control the turn-on duration of the transformer. So the power supply voltage in the standby mode and the power consumption are reduced.

11 Claims, 3 Drawing Sheets

Obtaining a corresponding level signals sent according to a current operating mode of the signal generation unit, the level signals corresponds to the normal mode is the low level signals, and the level signals corresponds to the standby mode is the high level signals — S101

Dividing the voltage obtained from the transformer according to the level signals to obtain a dividing voltage, and determining the frequency of the output signals of the first switch transistor, the frequency of the output signals includes a first frequency and a second frequency, when the level signal is at low level, the frequency of the output signals is the second frequency, and when the level signal is at high level, the frequency of the output signals is the first frequency, the second frequency is greater than the first frequency — S102

Obtaining the output signals and sets the frequency of the output signals as the operating frequency to control the turn-on duration of the transformer and the power consumption of the transformer — S103

(56) References Cited

U.S. PATENT DOCUMENTS

| | | | | |
|---|---|---|---|---|
| 6,009,005 | A | * | 12/1999 | Kim .................. H02M 3/33507 363/131 |
| 2003/0201758 | A1 | * | 10/2003 | Chen .................... H02M 3/156 323/222 |
| 2008/0150507 | A1 | * | 6/2008 | Yanagishima ........ H02M 3/156 323/283 |
| 2012/0081085 | A1 | * | 4/2012 | Miyamae .............. H02M 3/156 323/271 |
| 2012/0147631 | A1 | * | 6/2012 | Nate ................ H02M 3/33507 363/21.15 |
| 2014/0145632 | A1 | * | 5/2014 | Wey .................. H05B 33/0815 315/193 |
| 2015/0236659 | A1 | * | 8/2015 | Bai ........................ H03F 3/211 330/295 |
| 2015/0381058 | A1 | * | 12/2015 | Ye ....................... H02M 7/2176 363/21.15 |

* cited by examiner

CIRCUIT AND METHOD FOR CONTROLLING STANDYBY POWER CONSUMPTION

This application claims priority to China Patent Application No. 201410099625.8 filed on Mar. 18, 2014 entitled, CIRCUIT AND METHOD FOR CONTROLLING STANDBY POWER CONSUMPTION, all of the disclosures of which are incorporated herein by reference in their entirety.

BACKGROUND OF THE INVENTION

1. Field of the Invention

Embodiments of the present disclosure relate to electronic technology, and more particularly to a circuit and method for controlling standby power consumption.

2. Discussion of the Related Art

Low carbon life is a current trend, and how to save energy is a common issue for the society. Most of the time, the home electrical appliances are in a standby mode, i.e., the plugs remain locked in the outlets. Under the circumstances, key components, i.e., transformer, are still supplied with power in the standby mode. As the power consumption of the key components, generally, is huge, and thus it is needed to reduce the power consumption when the home electrical appliances are in the standby mode.

SUMMARY

The object of the claimed invention is to provide a circuit and method for controlling standby power consumption, which are capable of reducing the power supply voltage in a standby mode for electrical appliances. As such, the power consumption of key components is decreased, and so does the electrical appliances.

In one aspect, a circuit for controlling standby power consumption includes: a main power supply, a transformer, a first switch transistor, a load, a low frequency divider circuit, and a signal generation unit; a first input end of the transformer connects to one end of the main power supply, a second input end of the transformer connects to the drain of the first switch transistor, an output end of the transformer connects to one end of the signal generation unit and a voltage input end of the low frequency divider circuit for transforming the voltage provided by the main power supply and for outputting the transformed voltage to the signal generation unit and the low frequency divider circuit; the other end of the signal generation unit connects to an signal input end of the low frequency divider circuit for obtaining the voltage outputted from the transformer, and for sending a corresponding level signals to the low frequency divider circuit in accordance with a current operating mode, the operating mode comprising a normal mode and a standby mode, the normal mode corresponds to a low level signals, and the standby mode corresponds to a high level signals; an output end of the low frequency divider circuit connects to the gate of the first switch transistor for receiving the level signals transmitted from the signal generation unit and the voltage outputted from the transformer, the low frequency divider circuit being configured for dividing the received voltage in accordance with the level signals so as to obtain a divided voltage, and for determining the frequency of the output signals for the first switch transistor in accordance with the divided voltage, wherein the frequency of the output signals comprises a first frequency and a second frequency, the frequency of the output signals is the second frequency when the level signal is at low level, the frequency of the output signals is the first frequency when the level signal is at high level, and the second frequency is greater than the first frequency; and the source of the first switch transistor connects to the load for receiving the output signals from the low frequency divider circuit, and for setting the frequency of the output signals as the operating frequency so as to control a turn-on duration of the transformer and a power consumption of the transformer.

Wherein the low frequency divider circuit comprises a divider circuit, an optoelectronic coupling comparing module and a frequency switching module, and wherein: the divider circuit comprises a first divider circuit and a second divider circuit, the first divider circuit comprises at least one divider load, one end of the divider load connects to the output end of the transformer, and the other end of the divider load connects to the second divider circuit and the input end of the optoelectronic coupling comparing module; the second divider circuit comprises a second switch transistor and at least two divider loads, the second switch transistor and the at least one divider load are serially connected, and the second switch transistor and the other load or other loads are connected in parallel, wherein a gate of the second switch transistor connects to a signal end of the signal generation unit, and the source or the drain of the second switch transistor connects to at least one divider load; the divider circuit turns on or off the second switch transistor in accordance with the level signals from the signal generation unit so as to divide the voltage from the transformer and then to provide the divided voltage to the optoelectronic coupling comparing module, the second switch transistor is turn off when the level signals is the low level signals, and the second switch transistor is turn on when the level signals is the high level signals; the optoelectronic coupling comparing module comprises an adjustable precision shunt regulator, an optoelectronic coupler, and a shunt load for receiving the voltage outputted from the divider circuit and for comparing the voltage with a predetermined reference voltage of the adjustable precision shunt regulator, the optoelectronic coupler outputs a feedback voltage to the frequency switching module according to a comparison result, a first end of the adjustable precision shunt regulator is the input end of the optoelectronic coupling comparing module, a second end of the adjustable precision shunt regulator connects to a first end of the optoelectronic coupler, a third end is grounded, a second end of the optoelectronic coupler connects to the first end of the shunt load and the input end of the frequency switching module, the second end of the shunt load connects to an external fixed voltage source; and the frequency switching module comprises a microcontroller, a first switch, a second switch, a first frequency module and a second frequency module for obtaining the feedback voltage outputted from the optoelectronic coupling comparing module and for comparing the feedback voltage with a predetermined first comparing voltage of the microcontroller, the microcontroller turns on or off the first switch and the second switch in accordance with the comparison result, the microcontroller controls the first frequency module or the second frequency module to transmit the output signals to the first switch transistor, the input end of the microcontroller connects to the second end of the optoelectronic coupler, the first output end of the microcontroller connects to the first switch and the first frequency module to form a connected circuit, and the second output end of the microcontroller connects to the second switch and the second frequency module to form another connected circuit.

Wherein the low frequency divider circuit comprises an amplifier, the input end of the amplifier connects to the second end of the optoelectronic coupler of the optoelectronic coupling comparing module, and the output end of the amplifier connects to the input end of the microcontroller within the frequency switching module.

Wherein the amplifier comprises another input end connecting to a three-end regulator generating the output voltage.

Wherein the external fixed power supply is the transformer, the second end of the shunt load within the optoelectronic coupling comparing module connects to the output end of the transformer.

Wherein when the obtained feedback voltage is smaller than the first predetermined comparing voltage of the microcontroller, the microcontroller turns on the first switch and turns off the second switch, the first frequency module is controlled to output the first frequency to the first transistor such that the frequency of the output signals for the first switch transistor is the first frequency; and when the obtained feedback voltage is greater than the first predetermined comparing voltage of the microcontroller, the microcontroller turns off the first switch and turns on the second switch, and the second frequency module is controlled to output the second frequency to the first transistor such that the frequency of the output signals for the first switch transistor is the second frequency.

In another aspect, a circuit for controlling standby power consumption includes: a main power supply, a transformer, a first switch transistor, a load, a divider circuit, an optoelectronic coupling comparing module, a frequency switching module, and a signal generation unit; wherein: a first input end of the transformer connects to one end of the main power supply, a second input end of the transformer connects to the drain of the first switch transistor, an output end connects to one end of the signal generation unit and a voltage input end of the divider circuit for transforming the voltage provided by the main power supply and for outputting the transformed voltage to the signal generation unit and the divider circuit; the other end of the signal generation unit connects to the divider circuit for obtaining the voltage outputted from the transformer, and for sending a corresponding level signals to the divider circuit in accordance with a current operating mode, the operating mode comprises a normal mode and a standby mode, the normal mode corresponds to a low level signals, and the standby mode corresponds to a high level signals; the divider circuit comprises a first divider circuit and a second divider circuit, the first divider circuit comprises at least one divider load, one end of the divider load connects to the output end of the transformer, and the other end of the divider load connects to the second divider circuit and the input end of the optoelectronic coupling comparing module; the second divider circuit comprises a second switch transistor and at least two divider loads, the second switch transistor and the at least one divider load are serially connected, and the second switch transistor and the other load or other loads are connected in parallel, wherein a gate of the second switch transistor connects to a signal end of the signal generation unit, and a source or a drain of the second switch transistor connects to at least one divider load; the divider circuit turns on or off the second switch transistor in accordance with the level signals from the signal generation unit so as to divide the voltage from the transformer and then to provide the divided voltage to the optoelectronic coupling comparing module, the second switch transistor is turn off when the level signals is the low level signals, and the second switch transistor is turn on when the level signals is the high level signals; the optoelectronic coupling comparing module comprises an adjustable precision shunt regulator, an optoelectronic coupler, and a shunt load for receiving the voltage outputted from the divider circuit and for comparing the voltage with a predetermined reference voltage of the adjustable precision shunt regulator, the optoelectronic coupler outputs a feedback voltage to the frequency switching module according to a comparison result, a first end of the adjustable precision shunt regulator is the input end of the optoelectronic coupling comparing module, a second end of the adjustable precision shunt regulator connects to a first end of the optoelectronic coupler, a third end is grounded, a second end of the optoelectronic coupler connects to the first end of the shunt load and the input end of the frequency switching module, the second end of the shunt load connects to an external fixed voltage source; and the frequency switching module comprises a microcontroller, a first switch, a second switch, a first frequency module and a second frequency module for obtaining the feedback voltage outputted from the optoelectronic coupling comparing module and for comparing the feedback voltage with a predetermined first comparing voltage of the microcontroller, the microcontroller turns on or off the first switch and the second switch in accordance with the comparison result, the microcontroller controls the first frequency module or the second frequency module to transmit the output signals to the first switch transistor, the input end of the microcontroller connects to the second end of the optoelectronic coupler, the first output end of the microcontroller connects to the first switch and the first frequency module to form a connected circuit, and the second output end of the microcontroller connects to the second switch and the second frequency module to form another connected circuit; and the source of the first switch transistor connects to the load for receiving the output signals from the frequency switching module, and for setting the frequency of the output signals to be the operating frequency so as to control a turn-on duration of the transformer and the power consumption of the transformer.

Wherein the circuit further comprises an amplifier, the input end of the amplifier connects to the second end of the optoelectronic coupler of the optoelectronic coupling comparing module, and the output end of the amplifier connects to the input end of the microcontroller within the frequency switching module.

Wherein the amplifier comprises another input end connecting to a three-end regulator generating the output voltage.

Wherein the external fixed power supply is the transformer, and the second end of the shunt load within the optoelectronic coupling comparing module connects to the output end of the transformer.

Wherein when the obtained feedback voltage is smaller than the first predetermined comparing voltage of the microcontroller, the microcontroller turns on the first switch and turns off the second switch, the first frequency module is controlled to output the first frequency to the first transistor such that the frequency of the output signals for the first switch transistor is the first frequency; and when the obtained feedback voltage is greater than the first predetermined comparing voltage of the microcontroller, the microcontroller turns off the first switch and turns on the second switch, and the second frequency module is controlled to output the second frequency to the first transistor such that the frequency of the output signals for the first switch transistor is the second frequency.

In another aspect, a method for controlling standby power consumption includes: obtaining a corresponding level signals sent according to a current operating mode of the signal generation unit, the current operating mode comprises a normal mode and a standby mode, the normal mode corresponds to a low level signals, and the standby mode corresponds to a high level signals; dividing a voltage obtained from the transformer according to the level signals, and determining a frequency of the output signals for the first switch transistor, and wherein the frequency of the output signals comprises a first frequency and a second frequency, the frequency of the output signals is the second frequency when the level signal is at low level, the frequency of the output signals is the first frequency when the level signal is at high level, and the second frequency is greater than the first frequency; and receiving the output signals by the first switch transistor and setting the frequency of the output signals as the operating frequency so as to control a turn-on duration of the transformer and a power consumption of the transformer.

Wherein the dividing step further comprises: (a) dividing the voltage obtained from the transformer according to the level signals; (b) comparing the dividing voltage with a predetermined reference voltage to obtain a feedback voltage; and (c) comparing the feedback voltage with a predetermined first comparing voltage, and for determining the frequency of the output signals for the first switch transistor.

Wherein when the level signals is the low level signals, the dividing voltage is greater than the condition when the level signals is the high level signals.

Wherein when the dividing voltage is greater than the predetermined reference voltage, the feedback voltage is greater than the condition when the dividing voltage is smaller than the predetermined reference voltage, and the obtained feedback voltage is directly proportional to the dividing voltage.

Wherein the step (c) further comprises: the frequency of the output signals for the first switch transistor is the first frequency when the obtained feedback voltage is smaller than the predetermined first comparing voltage; and the frequency of the output signals for the first switch transistor is the second frequency when the obtained feedback voltage is greater than the predetermined first comparing voltage.

Wherein the method further comprises a step after step (b) and before step (c) comprising: comparing the obtained feedback voltage with the second predetermined comparing voltage to obtain an amplified voltage, and the amplified voltage is set as the current feedback voltage.

Wherein the second comparing voltage is the voltage generated by a three-end regulator.

In view of the above, after receiving a standby instruction, the signal generation unit transits from the normal mode to the standby mode and transmits the high level signals, instead of the low level signals. As the operating frequency of the first switch transistor switches from the second frequency to a smaller first frequency, the switch transistor is capable of controlling the turn-on duration of the transformer. As such, the output power of the transformer is reduced, and the standby voltage of the signal generation unit is also reduced so as to achieve the object of reducing the power consumption.

DETAILED DESCRIPTION OF THE EMBODIMENTS

Embodiments of the invention will now be described more fully hereinafter with reference to the accompanying drawings, in which embodiments of the invention are shown.

Figure 1:
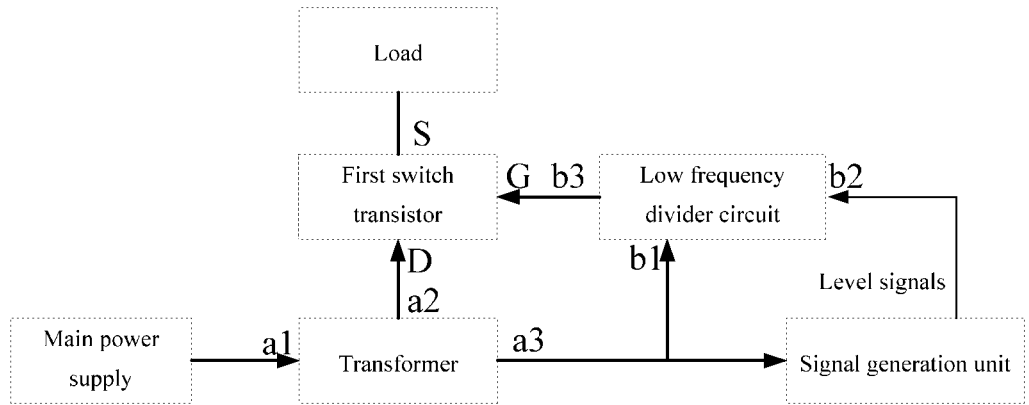
FIG. 1 is a schematic view of the circuit for controlling standby power consumption in accordance with a first embodiment and a second embodiment.
Figure 2:
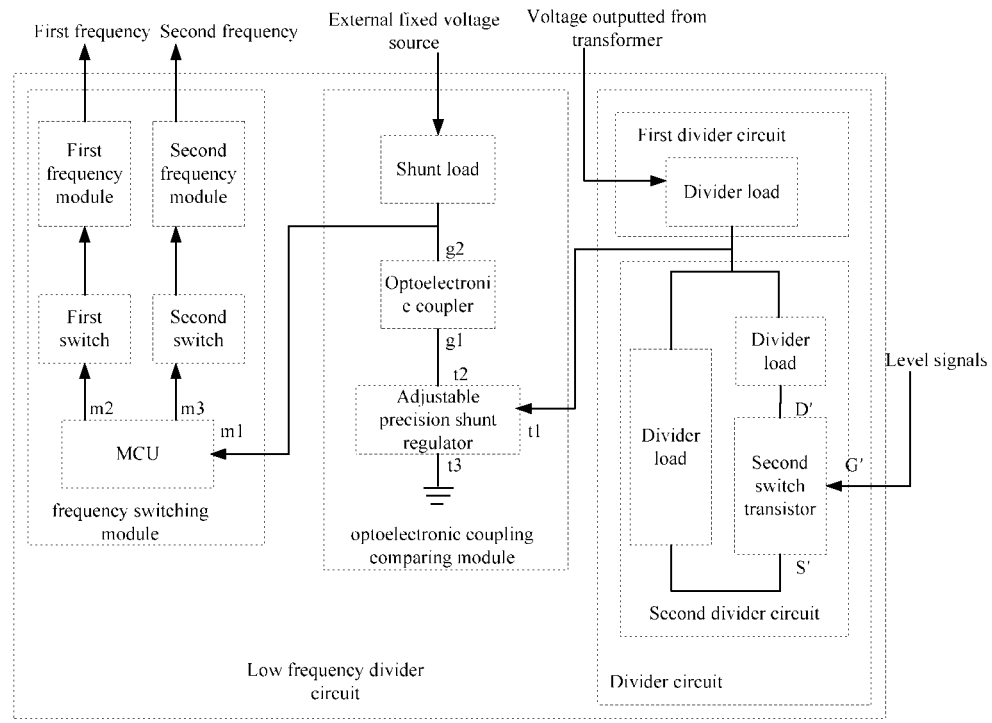
FIG. 2 is a schematic view of the low frequency divider circuit of FIG. 1.
Figure 3:
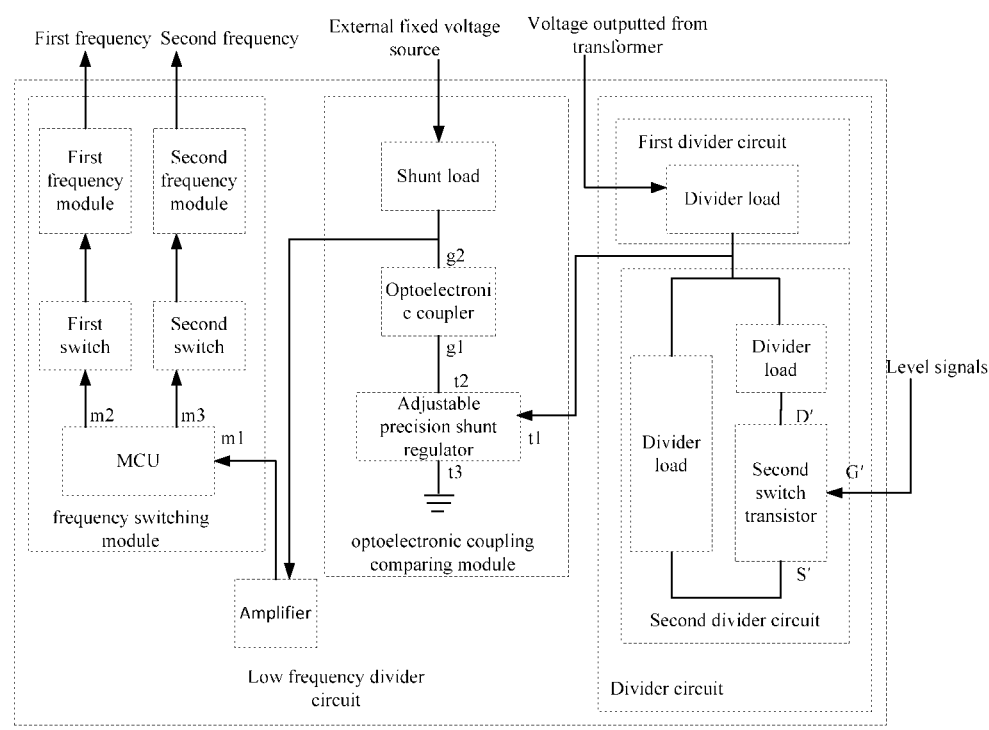
FIG. 3 is another schematic view of the low frequency divider circuit of FIG. 1.

FIGS. 1 to 3 have shown the embodiments of the circuit for controlling standby power consumption ("circuit").

FIG. 1 is a schematic view of the circuit in accordance with a first embodiment.

The circuit includes a main power supply, a transformer, a first switch transistor, a load, a low frequency divider circuit, and a signal generation unit.

A first input end (a1) of the transformer connects to one end of the main power supply. A second input end (a2) of the transformer connects to the drain (D) of the first switch transistor. A third input end (a3) connects to one end of the signal generation unit and a voltage input end (b1) of the low frequency divider circuit for transforming the voltage provided by the main power supply and for outputting the transformed voltage to the signal generation unit and the low frequency divider circuit.

The other end of the signal generation unit connects to an signal input end of the low frequency divider circuit for obtaining the voltage outputted from the transformer, and for sending a corresponding level signals to the low frequency divider circuit in accordance with a current operating mode. The operating mode includes a normal mode and a standby mode. The normal mode corresponds to a low level signals, and the standby mode corresponds to a high level signals.

An output end (b3) of the low frequency divider circuit connects to the gate (G) of the first switch transistor for receiving the level signals transmitted from the signal generation unit and the voltage outputted from the transformer. In addition, the low frequency divider circuit is configured for dividing the received voltage in accordance with the level signals so as to obtain a divided voltage, and for determining the frequency of the output signals for the first switch transistor in accordance with the divided voltage. The frequency of the output signals includes a first frequency and a second frequency. When the level signal is at low level, the frequency of the output signals is the second frequency. When the level signal is at high level, the frequency of the output signals is the first frequency. The second frequency is greater than the first frequency.

The source (S) of the first switch transistor connects to the load for receiving the output signals from the low frequency divider circuit, and for setting the frequency of the output signals to be the operating frequency so as to control a turn-on duration of the transformer and the power consumption of the transformer.

Furthermore, the low frequency divider circuit includes a divider circuit, an optoelectronic coupling comparing module and a frequency switching module.

The divider circuit includes a first divider circuit and a second divider circuit. The first divider circuit includes at least one divider load. One end of the divider load connects to the output end (a3) of the transformer, and the other end of the divider load connects to the second divider circuit and the input end of the optoelectronic coupling comparing module.

The second divider circuit includes a second switch transistor and at least two divider loads, the second switch transistor and the at least one divider load are serially connected, and the second switch transistor and the other load or other loads are connected in parallel. Wherein the gate (G') of the second switch transistor connects to the signal end (s2) of the signal generation unit, and the source (S') or the drain (D') of the second switch transistor connects to at least one divider load.

The divider circuit turns on or off the second switch transistor in accordance with the level signals from the signal generation unit so as to divide the voltage from the transformer and then to provide the divided voltage to the optoelectronic coupling comparing module. When the level signals is the low level signals, the second switch transistor is turn off. When the level signals is the high level signals, the second switch transistor is turn on.

The optoelectronic coupling comparing module includes an adjustable precision shunt regulator, an optoelectronic coupler, and a shunt load for receiving the voltage outputted from the divider circuit and for comparing the voltage with a predetermined reference voltage of the adjustable precision shunt regulator. The optoelectronic coupler outputs a feedback voltage to the frequency switching module according to the comparison result. A first end (t1) of the adjustable precision shunt regulator is the input end of the optoelectronic coupling comparing module, which is between the first divider circuit and the second divider circuit. A second end (t2) of the adjustable precision shunt regulator connects to a first end (g1) of the optoelectronic coupler. A third end (t3) is grounded. A second end (g2) of the optoelectronic coupler connects to the first end of the shunt load and the input end of the frequency switching module. The second end of the shunt load connects to an external fixed voltage source.

The frequency switching module includes a microcontroller, a first switch, a second switch, a first frequency module and a second frequency module for obtaining the feedback voltage outputted from the optoelectronic coupling comparing module and for comparing the feedback voltage with a predetermined first comparing voltage of the microcontroller. The microcontroller turns on or off the first switch and the second switch in accordance with the comparison result. Also, the microcontroller controls the first frequency module or the second frequency module to transmit the output signals to the first switch transistor. The input end (m1) of the microcontroller connects to the second end (g2) of the optoelectronic coupler. The first output end (m2) of the microcontroller connects to the first switch and the first frequency module to form a connected circuit. The second output end (m3) of the microcontroller connects to the second switch and the second frequency module to form another connected circuit.

Furthermore, the low frequency divider circuit includes an amplifier. The input end of the amplifier connects to the second end (g2) of the optoelectronic coupler of the optoelectronic coupling comparing module. The output end of the amplifier connects to the input end (m1) of the microcontroller for amplifying the feedback voltage outputted from the optoelectronic coupler and for outputting the amplified voltage to the frequency switching module.

Furthermore, the amplifier includes another input end connecting to a three-end regulator generating the output voltage. The predetermined second comparing voltage for the input end is the output voltage generated by the three-end regulator. The output voltage is compared with the feedback voltage outputted from the optoelectronic coupler. After being compared, the voltage is amplified to generate a new feedback voltage to be outputted to the frequency switching module.

Furthermore, the external fixed power supply is the transformer. The second end of the divider load within the optoelectronic coupling comparing module connects to the output end (a3) of the transformer.

Furthermore, when the obtained feedback voltage is smaller than the first predetermined comparing voltage of the microcontroller, the microcontroller turns on the first switch and turns off the second switch. The first frequency module is controlled to output the first frequency to the first transistor. When the obtained feedback voltage is greater than the first predetermined comparing voltage of the microcontroller, the microcontroller turns off the first switch and turns on the second switch. The second frequency module is controlled to output the second frequency to the first transistor.

The operating principle of the circuit for controlling standby power consumption in the first embodiment will be described hereinafter. After receiving a standby instruction, the signal generation unit transits from the normal mode to the standby mode and transmits the high level signals, instead of the low level signals. The second switch transistor of the low frequency divider circuit is turned on after receiving the high level signals. As the load of the second includes a parallel connection structure, the resistance is higher than the condition when the second switch transistor is turned off. As such, the voltage at two ends of the second divider circuit ("U1") is decreased. That is, the output voltage received by the transformer is divided by the divider circuit, and thus the voltage outputted to the optoelectronic coupling comparing module is decreased.

After receiving the voltage (U1), the optoelectronic coupling comparing module compares the voltage (U1) with the predetermined reference voltage by the adjustable precision shunt regulator such that the amount of the current passing through the optoelectronic coupler increases, which decreases the resistance within the optoelectronic coupler. In addition, as the optoelectronic coupler and the shunt load are serially connected, the voltage at two ends of the optoelectronic coupler ("U2") is decreased. That is, the voltage outputted by the optoelectronic coupling comparing module is decreased. It can be understood that an appropriate adjustable precision shunt regulator may be selected such that the voltage (U1) is greater than the predetermined reference voltage upon receiving the low level signals, i.e., operating in the normal mode, and the amount of the current passing through the optoelectronic coupler is decreased. In addition, when the voltage (U1) is smaller than the predetermined reference voltage upon receiving the high level signals, i.e., operating in the standby mode, and the amount of the current passing through the optoelectronic coupler is increased.

After receiving the voltage (U2), the amplifier compares the voltage (U2) with the predetermined second voltage of the amplifier and then amplifies the voltage (U2) to obtain an amplified voltage (U0) to be outputted to the frequency switching module. The frequency switching module compares the amplified voltage (U0) and the predetermined first voltage of the microcontroller. The second switch is turned off and the first switch is turned on. The second frequency is switched to the first frequency, and the output signals, wherein the operating frequency is the first frequency, is outputted to the first switch transistor. The predetermined first voltage of the microcontroller may be designed such that the when the low level signals is received, i.e., normal mode, the amplified voltage (U0) is greater than the predetermined first voltage. The first switch is turned off and the second switch is turned on. The second frequency is selected and outputted to the first switch transistor. When the high level signals is received, i.e., standby mode, the amplified voltage (U0) is smaller than the predetermined first voltage. The first switch is turned on and the second switch is turned off. The first frequency is selected and outputted to the first switch transistor.

The first switch transistor sets the frequency of the obtained output signals as its operating frequency such that the first switch transistor may control the duration for which the transformer is turned on. In this way, the output power of the transformer is reduced, which results in that the standby voltage of the signal generation unit is reduced, and so does the standby power consumption.

For instance, the voltage equals to 5V when the signal generation unit is in the normal mode, and the outputted level signals is the low level signals. The voltage (U1) at two ends of the second divider circuit equals to k1. The voltage (U2) at two ends of the optoelectronic coupler equals to k2. The voltage (U2) is compared and amplified such that the amplified voltage (U0) equals to k0. At this moment, the predetermined first voltage of the microcontroller is smaller than k0. The second switch is turned on, and the first switch is turned off. The operating frequency of the first switch transistor is the second frequency provided by the second frequency module, i.e., 65 Hz.

After receiving the standby instruction, the signal generation unit transits to the standby mode from the normal mode. The outputted level signals is the high level signals. As the second switch transistor of the second divider circuit is turned on, the voltage (U1) at two ends of the second divider circuit equals to j1, which is smaller than k1. The voltage (U2) at two ends of the optoelectronic coupler equals to j2, which is smaller than k2. Thus, the amplified voltage (U0) equals to j0, which is smaller than k0. At this moment, the predetermined first voltage of the microcontroller is greater than j0. The first switch is turned on, and the second switch is turned off. The operating frequency of the first switch transistor switches from the second frequency provided by the second frequency module, i.e., 65 Hz, to the first frequency provided by the first frequency module, i.e., 10 Hz. In this way, the output power of the transformer is reduced, and the voltage obtained by the signal generation unit in the standby mode equals to 3.3 V, which is smaller than 5V in the normal mode.

In the second embodiment, the circuit for controlling standby power consumption includes a main power supply, a transformer, a first switch transistor, a load, a divider circuit, a optoelectronic coupling comparing module, a frequency switching module, and a signal generation unit.

A first input end (a1) of the transformer connects to one end of the main power supply. A second input end (a2) of the transformer connects to the drain (D) of the first switch transistor. A third input end (a3) connects to one end of the signal generation unit and a divider circuit for transforming the voltage supplied by the main power supply and for outputting the transformed voltage to the signal generation unit and the divider circuit.

The other end of the signal generation unit connects to an signal input end of the divider circuit for obtaining the voltage outputted from the transformer, and for sending a corresponding level signals to the divider circuit in accordance with a current operating mode. The operating mode includes a normal mode and a standby mode. The normal mode corresponds to a low level signals, and the standby mode corresponds to a high level signals.

The divider circuit includes a first divider circuit and a second divider circuit. The first divider circuit includes at least one divider load. One end of the divider load connects to the output end (a3) of the transformer, and the other end of the divider load connects to the second divider circuit and the input end of the optoelectronic coupling comparing module.

The second divider circuit includes a second switch transistor and at least two divider loads, the second switch transistor and the at least one divider load are serially connected, and the second switch transistor and the other load or other loads are connected in parallel.

Wherein the gate (G') of the second switch transistor connects to the signal end (s2) of the signal generation unit, and the source (S') or the drain (D') of the second switch transistor connects to at least one divider load.

The divider circuit turns on or off the second switch transistor in accordance with the level signals from the signal generation unit so as to divide the voltage from the transformer and then to provide the divided voltage to the optoelectronic coupling comparing module. When the level signals is the low level signals, the second switch transistor is turn off. When the level signals is the high level signals, the second switch transistor is turn on.

The optoelectronic coupling comparing module includes an adjustable precision shunt regulator, an optoelectronic coupler, and a shunt load for receiving the voltage outputted from the divider circuit and for comparing the voltage with a predetermined reference voltage of the adjustable precision shunt regulator. The optoelectronic coupler outputs a feedback voltage to the frequency switching module according to the comparison result. A first end (t1) of the adjustable precision shunt regulator is the input end of the optoelectronic coupling comparing module, which is between the first divider circuit and the second divider circuit. A second end (t2) of the adjustable precision shunt regulator connects to a first end (g1) of the optoelectronic coupler. A third end (t3) is grounded. A second end (g2) of the optoelectronic coupler connects to the first end of the shunt load and the input end of the frequency switching module. The second end of the shunt load connects to an external fixed voltage source.

The frequency switching module includes a microcontroller, a first switch, a second switch, a first frequency module and a second frequency module for obtaining the feedback voltage outputted from the optoelectronic coupling comparing module and for comparing the feedback voltage with a predetermined first comparing voltage of the microcontroller. The microcontroller turns on or off the first switch and the second switch in accordance with the comparison result. Also, the microcontroller controls the first frequency module or the second frequency module to transmit the output signals to the first switch transistor. The input end (m1) of the microcontroller connects to the second end (g2) of the optoelectronic coupler. The first output end (m2) of the microcontroller connects to the first switch and the first frequency module to form a connected circuit. The second output end (m3) of the microcontroller connects to the second switch and the second frequency module to form another connected circuit.

The source (S) of the first switch transistor connects to the load for receiving the output signals from the frequency switching module, and for setting the frequency of the output signals to be the operating frequency so as to control a turn-on duration of the transformer and the power consumption of the transformer.

Furthermore, the divider circuit includes an amplifier. The input end of the amplifier connects to the second end (g2) of the optoelectronic coupler of the optoelectronic coupling comparing module. The output end of the amplifier connects to the input end (m1) of the microcontroller for amplifying the feedback voltage outputted from the optoelectronic coupler and for outputting the amplified voltage to the frequency switching module.

Furthermore, the amplifier includes another input end connecting to a three-end regulator generating the output voltage. The predetermined second comparing voltage for the input end is the output voltage generated by the three-end regulator. The output voltage is compared with the feedback voltage outputted from the optoelectronic coupler. After being compared, the voltage is amplified to generate a new feedback voltage to be outputted to the frequency switching module.

Furthermore, the external fixed power supply is the transformer. The second end of the shunt load within the optoelectronic coupling comparing module connects to the output end (a3) of the transformer.

Furthermore, when the obtained feedback voltage is smaller than the first predetermined comparing voltage of the microcontroller, the microcontroller turns on the first switch and turns off the second switch. The first frequency module is controlled to output the first frequency to the first transistor. When the obtained feedback voltage is greater than the first predetermined comparing voltage of the microcontroller, the microcontroller turns off the first switch and turns on the second switch. The second frequency module is controlled to output the second frequency to the first transistor.

The operating principle of the circuit for controlling standby power consumption in the second embodiment are similar to that of the circuit in the first embodiment.

Figure 4:
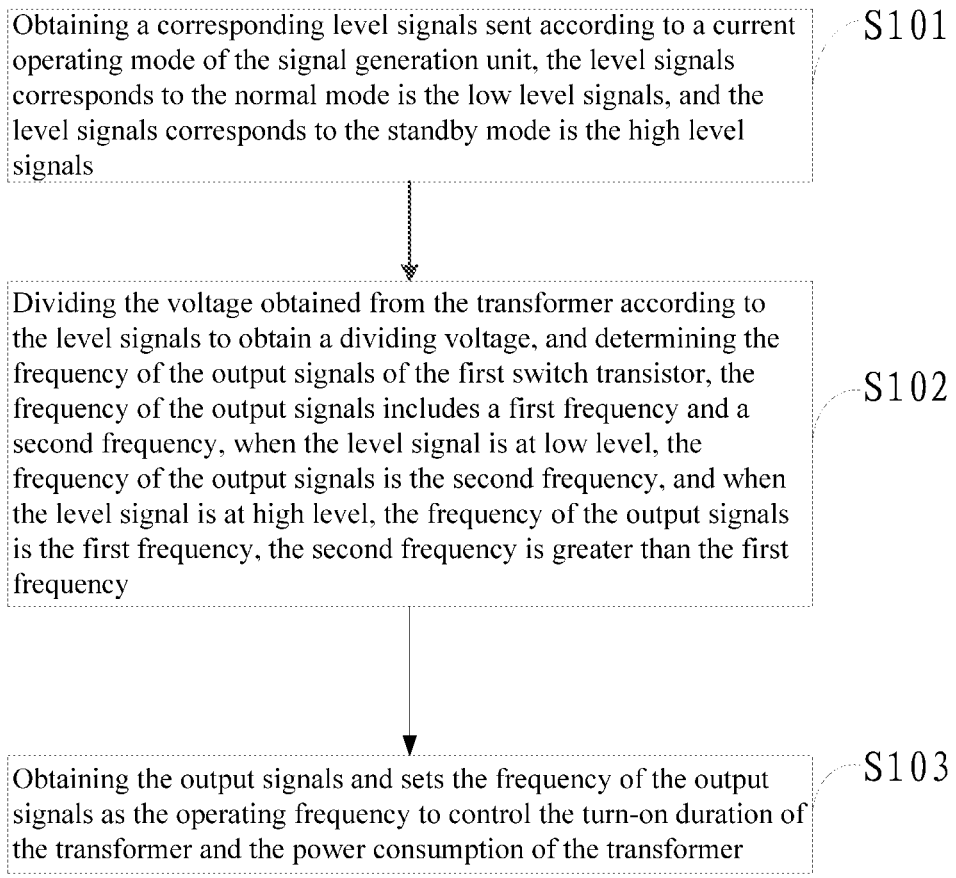
FIG. 4 is a flowchart illustrating the method for controlling standby power consumption in accordance with a third embodiment.

FIG. 4 is a flowchart illustrating the method for controlling standby power consumption ("method") in accordance with a third embodiment. The method includes the following steps.

In step S101, a corresponding level signals sent according to a current operating mode of the signal generation unit is obtained. The level signals corresponds to the normal mode is the low level signals, and the level signals corresponds to the standby mode is the high level signals.

In step S102, the voltage obtained from the transformer is divided according to the level signals to obtain a dividing voltage, and the frequency of the output signals of the first switch transistor is determined. The frequency of the output signals includes a first frequency and a second frequency. When the level signal is at low level, the frequency of the output signals is the second frequency. When the level signal is at high level, the frequency of the output signals is the first frequency. The second frequency is greater than the first frequency.

The above steps will be described in detail hereinafter.

In step (a), the voltage obtained from the transformer is controlled to be divided according to the level signals so as to obtain the dividing voltage.

In step (a), when the level signals is the low level signals, the dividing voltage is greater than the condition when the level signals is the high level signals.

In step (b), the dividing voltage is compared with the predetermined reference voltage to obtain the feedback voltage.

In step (b), when the dividing voltage is greater than the predetermined reference voltage, the feedback voltage is greater than the condition when the dividing voltage is smaller than the predetermined reference voltage, and the obtained feedback voltage is directly proportional to the dividing voltage.

In addition, the method also includes a step executed after step (b) and before the step (c) including: comparing the obtained feedback voltage with the second predetermined comparing voltage to obtain an amplified voltage. The amplified voltage is set as the current feedback voltage. The predetermined second comparing voltage is generated by the three-ends regulator.

In step (c), the obtained feedback voltage is compared with the predetermined first comparing voltage. According to the comparison result, the frequency of the output signals for the first switch transistor is determined.

Specifically, when the obtained feedback voltage is smaller than the predetermined first comparing voltage, the first frequency is set as the frequency of the output signals of the first switch transistor.

When the obtained feedback voltage is greater than the predetermined first comparing voltage, the second frequency is set as the frequency of the output signals of the first switch transistor.

In step S103, the first switch transistor obtains the output signals and sets the frequency of the output signals as the operating frequency to control the turn-on duration of the transformer, which also controls the power consumption of the transformer.

In view of the above, after receiving a standby instruction, the signal generation unit transits from the normal mode to the standby mode and transmits the high level signals, instead of the low level signals. As the operating frequency of the first switch transistor switches from the second frequency to a smaller first frequency, the switch transistor is capable of controlling the turn-on duration of the transformer. As such, the output power of the transformer is reduced, and the standby voltage of the signal generation unit is also reduced so as to achieve the object of reducing the power consumption.

The invention can also be embodied as computer readable codes on a computer readable recording medium. The computer readable recording medium is any data storage device that can store data which can be thereafter read by a computer system. Examples of the computer readable recording medium include ROM/RAM, discs, and CD-ROMs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A circuit for controlling standby power consumption, comprising:
   a main power supply, a transformer, a first switch transistor, a load, a low frequency divider circuit, and a signal generation unit;
   a first input end of the transformer connects to one end of the main power supply, a second input end of the transformer connects to the drain of the first switch transistor, an output end of the transformer connects to one end of the signal generation unit and a voltage input end of the low frequency divider circuit for transforming the voltage provided by the main power supply and for outputting the transformed voltage to the signal generation unit and the low frequency divider circuit;

the other end of the signal generation unit connects to an signal input end of the low frequency divider circuit for obtaining the voltage outputted from the transformer, and for sending a corresponding level signals to the low frequency divider circuit in accordance with a current operating mode, the operating mode comprising a normal mode and a standby mode, the normal mode corresponds to a low level signals, and the standby mode corresponds to a high level signals;

an output end of the low frequency divider circuit connects to the gate of the first switch transistor for receiving the level signals transmitted from the signal generation unit and the voltage outputted from the transformer, the low frequency divider circuit being configured for dividing the received voltage in accordance with the level signals so as to obtain a divided voltage, and for determining the frequency of the output signals for the first switch transistor in accordance with the divided voltage, wherein the frequency of the output signals comprises a first frequency and a second frequency, the frequency of the output signals is the second frequency when the level signal is at low level, the frequency of the output signals is the first frequency when the level signal is at high level, and the second frequency is greater than the first frequency; and the source of the first switch transistor connects to the load for receiving the output signals from the low frequency divider circuit, and for setting the frequency of the output signals as the operating frequency so as to control a turn-on duration of the transformer and a power consumption of the transformer.

2. The circuit as claimed in claim 1, wherein the low frequency divider circuit comprises a divider circuit, an optoelectronic coupling comparing module and a frequency switching module, and wherein:

the divider circuit comprises a first divider circuit and a second divider circuit, the first divider circuit comprises at least one divider load, one end of the divider load connects to the output end of the transformer, and the other end of the divider load connects to the second divider circuit and the input end of the optoelectronic coupling comparing module;

the second divider circuit comprises a second switch transistor and at least two divider loads, the second switch transistor and the at least one divider load are serially connected, and the second switch transistor and the other load or other loads are connected in parallel, wherein a gate of the second switch transistor connects to a signal end of the signal generation unit, and the source or the drain of the second switch transistor connects to at least one divider load;

the divider circuit turns on or off the second switch transistor in accordance with the level signals from the signal generation unit so as to divide the voltage from the transformer and then to provide the divided voltage to the optoelectronic coupling comparing module, the second switch transistor is turned off when the level signals is the low level signals, and the second switch transistor is turned on when the level signals is the high level signals;

the optoelectronic coupling comparing module comprises an adjustable precision shunt regulator, an optoelectronic coupler, and a shunt load for receiving the voltage outputted from the divider circuit and for comparing the voltage with a predetermined reference voltage of the adjustable precision shunt regulator, the optoelectronic coupler outputs a feedback voltage to the frequency switching module according to a comparison result, a first end of the adjustable precision shunt regulator is the input end of the optoelectronic coupling comparing module, a second end of the adjustable precision shunt regulator connects to a first end of the optoelectronic coupler, a third end is grounded, a second end of the optoelectronic coupler connects to the first end of the shunt load and the input end of the frequency switching module, the second end of the shunt load connects to an external fixed voltage source; and the frequency switching module comprises a microcontroller, a first switch, a second switch, a first frequency module and a second frequency module for obtaining the feedback voltage outputted from the optoelectronic coupling comparing module and for comparing the feedback voltage with a predetermined first comparing voltage of the microcontroller, the microcontroller turns on or off the first switch and the second switch in accordance with the comparison result, the microcontroller controls the first frequency module or the second frequency module to transmit the output signals to the first switch transistor, the input end of the microcontroller connects to the second end of the optoelectronic coupler, the first output end of the microcontroller connects to the first switch and the first frequency module to form a connected circuit, and the second output end of the microcontroller connects to the second switch and the second frequency module to form another connected circuit.

3. The circuit as claimed in claim 2, wherein the low frequency divider circuit comprises an amplifier, the input end of the amplifier connects to the second end of the optoelectronic coupler of the optoelectronic coupling comparing module, and the output end of the amplifier connects to the input end of the microcontroller within the frequency switching module.

4. The circuit as claimed in claim 3, wherein the amplifier comprises another input end connecting to a three-end regulator generating the output voltage.

5. The circuit as claimed in claim 2, wherein the external fixed power supply is the transformer, the second end of the shunt load within the optoelectronic coupling comparing module connects to the output end of the transformer.

6. The circuit as claimed in claim 2, wherein when the obtained feedback voltage is smaller than the first predetermined comparing voltage of the microcontroller, the microcontroller turns on the first switch and turns off the second switch, the first frequency module is controlled to output the first frequency to the first transistor such that the frequency of the output signals for the first switch transistor is the first frequency; and when the obtained feedback voltage is greater than the first predetermined comparing voltage of the microcontroller, the microcontroller turns off the first switch and turns on the second switch, and the second frequency module is controlled to output the second frequency to the first transistor such that the frequency of the output signals for the first switch transistor is the second frequency.

7. A circuit for controlling standby power consumption, comprising:

a main power supply, a transformer, a first switch transistor, a load, a divider circuit, an optoelectronic coupling comparing module, a frequency switching module, and a signal generation unit;

wherein:

a first input end of the transformer connects to one end of the main power supply, a second input end of the transformer connects to the drain of the first switch transistor, an output end connects to one end of the signal generation unit and a voltage input end of the divider circuit for transforming the voltage provided by the main power supply and for outputting the transformed voltage to the signal generation unit and the divider circuit;

the other end of the signal generation unit connects to the divider circuit for obtaining the voltage outputted from the transformer, and for sending a corresponding level signals to the divider circuit in accordance with a current operating mode, the operating mode comprises a normal mode and a standby mode, the normal mode corresponds to a low level signals, and the standby mode corresponds to a high level signals;

the divider circuit comprises a first divider circuit and a second divider circuit, the first divider circuit comprises at least one divider load, one end of the divider load connects to the output end of the transformer, and the other end of the divider load connects to the second divider circuit and the input end of the optoelectronic coupling comparing module;

the second divider circuit comprises a second switch transistor and at least two divider loads, the second switch transistor and the at least one divider load are serially connected, and the second switch transistor and the other load or other loads are connected in parallel, wherein a gate of the second switch transistor connects to a signal end of the signal generation unit, and a source or a drain of the second switch transistor connects to at least one divider load;

the divider circuit turns on or off the second switch transistor in accordance with the level signals from the signal generation unit so as to divide the voltage from the transformer and then to provide the divided voltage to the optoelectronic coupling comparing module, the second switch transistor is turned off when the level signals is the low level signals, and the second switch transistor is turned on when the level signals is the high level signals;

the optoelectronic coupling comparing module comprises an adjustable precision shunt regulator, an optoelectronic coupler, and a shunt load for receiving the voltage outputted from the divider circuit and for comparing the voltage with a predetermined reference voltage of the adjustable precision shunt regulator, the optoelectronic coupler outputs a feedback voltage to the frequency switching module according to a comparison result, a first end of the adjustable precision shunt regulator is the input end of the optoelectronic coupling comparing module, a second end of the adjustable precision shunt regulator connects to a first end of the optoelectronic coupler, a third end is grounded, a second end of the optoelectronic coupler connects to the first end of the shunt load and the input end of the frequency switching module, the second end of the shunt load connects to an external fixed voltage source; and the frequency switching module comprises a microcontroller, a first switch, a second switch, a first frequency module and a second frequency module for obtaining the feedback voltage outputted from the optoelectronic coupling comparing module and for comparing the feedback voltage with a predetermined first comparing voltage of the microcontroller, the microcontroller turns on or off the first switch and the second switch in accordance with the comparison result, the microcontroller controls the first frequency module or the second frequency module to transmit the output signals to the first switch transistor, the input end of the microcontroller connects to the second end of the optoelectronic coupler, the first output end of the microcontroller connects to the first switch and the first frequency module to form a connected circuit, and the second output end of the microcontroller connects to the second switch and the second frequency module to form another connected circuit; and the source of the first switch transistor connects to the load for receiving the output signals from the frequency switching module, and for setting the frequency of the output signals to be the operating frequency so as to control a turn-on duration of the transformer and the power consumption of the transformer.

8. The circuit as claimed in claim 7, wherein the circuit further comprises an amplifier, the input end of the amplifier connects to the second end of the optoelectronic coupler of the optoelectronic coupling comparing module, and the output end of the amplifier connects to the input end of the microcontroller within the frequency switching module.

9. The circuit as claimed in claim 8, wherein the amplifier comprises another input end connecting to a three-end regulator generating the output voltage.

10. The circuit as claimed in claim 7, wherein the external fixed power supply is the transformer, and the second end of the shunt load within the optoelectronic coupling comparing module connects to the output end of the transformer.

11. The circuit as claimed in claim 7, wherein when the obtained feedback voltage is smaller than the first predetermined comparing voltage of the microcontroller, the microcontroller turns on the first switch and turns off the second switch, the first frequency module is controlled to output the first frequency to the first transistor such that the frequency of the output signals for the first switch transistor is the first frequency; and when the obtained feedback voltage is greater than the first predetermined comparing voltage of the microcontroller, the microcontroller turns off the first switch and turns on the second switch, and the second frequency module is controlled to output the second frequency to the first transistor such that the frequency of the output signals for the first switch transistor is the second frequency.

* * * * *